(12) United States Patent
Lecoester et al.

(10) Patent No.: US 11,208,941 B2
(45) Date of Patent: Dec. 28, 2021

(54) PART OF AN EXHAUST LINE, AND MANUFACTURING PROCESS OF SAID PART

(71) Applicant: Faurecia Systemes D'echappement, Nanterre (FR)

(72) Inventors: Francois Paul Pierre Lecoester, Montbeliard (FR); Hongjiang Cui, Meitingen (DE)

(73) Assignee: Faurecia Systemes D'echappement

( * ) Notice: Subject to any disclaimer, the term of this patent is extended or adjusted under 35 U.S.C. 154(b) by 462 days.

(21) Appl. No.: 15/955,964

(22) Filed: Apr. 18, 2018

(65) Prior Publication Data

US 2018/0306092 A1  Oct. 25, 2018

(30) Foreign Application Priority Data

Apr. 20, 2017 (FR) ..................... 1753437

(51) Int. Cl.
 *F01N 13/18* (2010.01)
 *B60K 13/04* (2006.01)
 *B23K 9/16* (2006.01)

(52) U.S. Cl.
CPC .......... *F01N 13/1805* (2013.01); *B60K 13/04* (2013.01); *F01N 13/1822* (2013.01); *F01N 13/1872* (2013.01); *B23K 9/16* (2013.01); *F01N 2450/22* (2013.01)

(58) Field of Classification Search
CPC ............ F01N 13/1822; F01N 13/1855; F01N 13/1872; F01N 13/1805; F01N 13/14; F01N 13/1811; F01N 13/08; F01N 2450/22; F01N 2450/24; B60K 13/04; B60K 15/067; B23K 9/16; B60R 13/0876; F16L 55/035; F16L 2201/60; B65D 2501/24904; B21C 51/005
See application file for complete search history.

(56) References Cited

U.S. PATENT DOCUMENTS 2,016,826 A * 10/1935 Thomasc .............. B60R 13/105
  411/354
2,196,694 A * 4/1940 Brauer ................ F01N 13/1872
  239/593
2,744,706 A * 5/1956 Gerdy ....................... F16B 2/10
  248/60

(Continued)

FOREIGN PATENT DOCUMENTS

DE 102007025616 A1 12/2008
FR     2919533 A3  2/2009

OTHER PUBLICATIONS

Search Report for French Application No. 1753437, dated Jan. 3, 2018.

*Primary Examiner* — Jonathan Liu
*Assistant Examiner* — Taylor L Morris
(74) *Attorney, Agent, or Firm* — Carlson, Gaskey & Olds, P.C.

(57) ABSTRACT

An exhaust line element includes an exhaust volume comprising a metal enclosure with a thickness smaller than 1 mm and at least one metal plate with a thickness comprised between 0.5 and 5 mm. The metal plate comprises a central part that does not contact the metal enclosure and between 2 and 4 fastening tabs are secured to the central part. Each fastening tab is spot and transparently welded to the metal enclosure.

14 Claims, 3 Drawing Sheets

(56) References Cited

U.S. PATENT DOCUMENTS

| | | | | |
|---|---|---|---|---|
| 3,386,529 A * | 6/1968 | Pannone | F01N 13/1805 | 181/243 |
| 3,416,820 A * | 12/1968 | Warwick | F01N 13/1805 | 285/399 |
| 3,605,214 A * | 9/1971 | Spotts et al. | F16L 25/04 | 24/277 |
| 3,746,127 A * | 7/1973 | Leventhal | F01N 13/1805 | 181/243 |
| 3,863,445 A * | 2/1975 | Heath | F01N 13/14 | 60/299 |
| 3,889,984 A * | 6/1975 | Lambiris | F01N 13/1805 | 285/27 |
| 3,890,827 A * | 6/1975 | Van Schoyck | G01N 15/0618 | 73/28.01 |
| 3,963,087 A * | 6/1976 | Grosseau | B60K 13/04 | 180/309 |
| 4,085,816 A * | 4/1978 | Amagai | F01N 13/14 | 180/89.2 |
| 4,209,155 A * | 6/1980 | Florian | F01N 13/1805 | 248/62 |
| 4,361,304 A * | 11/1982 | Younger | F16L 3/20 | 248/544 |
| 4,479,288 A * | 10/1984 | Jones | F01N 13/1805 | 24/276 |
| 4,494,722 A * | 1/1985 | Kanai | F01N 13/1822 | 248/566 |
| 4,550,795 A * | 11/1985 | Teshima | B60K 13/04 | 180/296 |
| 4,609,067 A * | 9/1986 | Gonwa | F01N 13/14 | 126/83 |
| 4,638,965 A * | 1/1987 | De Bruine | F01N 13/1822 | 180/89.2 |
| 5,036,947 A * | 8/1991 | Metzger | F01N 13/1844 | 181/241 |
| 5,069,275 A * | 12/1991 | Suzuki | B60K 11/04 | 165/67 |
| 5,121,810 A * | 6/1992 | Araki | F01N 13/1855 | 181/198 |
| 5,281,778 A * | 1/1994 | Cheladyn | F01N 13/14 | 181/211 |
| 5,284,289 A * | 2/1994 | Killian | B23K 9/0026 | 188/205 R |
| 5,290,974 A * | 3/1994 | Douglas | F01N 13/1805 | 181/228 |
| 5,310,158 A * | 5/1994 | Cassel | B60K 13/04 | 248/62 |
| 5,348,264 A * | 9/1994 | Few | B60N 2/3097 | 248/503.1 |
| 5,388,529 A * | 2/1995 | Tieberghien | B61D 17/04 | 105/397 |
| 5,474,123 A * | 12/1995 | Buckshaw | F28F 19/002 | 138/110 |
| 5,501,421 A * | 3/1996 | Kluting | E05C 17/045 | 248/288.31 |
| 5,673,877 A * | 10/1997 | Karner | F01N 13/1822 | 248/58 |
| 5,680,757 A * | 10/1997 | Pirchl | B60K 13/04 | 180/89.2 |
| 5,767,476 A * | 6/1998 | Imamura | B23K 11/11 | 219/117.1 |
| 5,817,991 A * | 10/1998 | Suyama | F01N 13/1822 | 181/243 |
| 5,844,177 A * | 12/1998 | Pirchl | B60R 13/08 | 181/211 |
| 5,845,037 A * | 12/1998 | Miekis | F21V 19/008 | 385/136 |
| 5,880,413 A * | 3/1999 | Wagner | B60K 13/04 | 181/211 |
| 5,890,685 A * | 4/1999 | Takahashi | B60K 13/04 | 248/74.1 |
| 5,907,135 A * | 5/1999 | Hayakawa | F01N 1/04 | 181/282 |
| 6,050,900 A * | 4/2000 | Reinhardt | B23K 20/10 | 464/180 |
| 6,058,702 A * | 5/2000 | Jorg Alexnat | B60K 13/04 | 60/322 |
| 6,173,800 B1 * | 1/2001 | Steenackers | B60K 13/04 | 180/89.2 |
| 6,217,089 B1 * | 4/2001 | Goto | B60R 19/18 | 293/102 |
| 6,283,361 B1 * | 9/2001 | Maki | B23K 37/0452 | 228/212 |
| 6,298,935 B1 * | 10/2001 | Steenackers | B60K 13/04 | 180/296 |
| 6,460,786 B1 * | 10/2002 | Roberts | G09F 3/02 | 239/542 |
| 6,481,673 B1 * | 11/2002 | Roe | B60K 13/04 | 248/300 |
| 6,536,548 B2 * | 3/2003 | Steenackers | B60K 13/04 | 180/296 |
| 6,575,198 B2 * | 6/2003 | Yoshitoshi | B21C 37/0803 | 138/115 |
| 6,595,571 B1 * | 7/2003 | Krebs | B60J 3/0217 | 248/289.11 |
| 6,702,062 B2 * | 3/2004 | Kusabiraki | F01N 13/08 | 181/212 |
| 6,758,300 B2 * | 7/2004 | Kromis | B60K 13/04 | 180/296 |
| 7,273,128 B2 * | 9/2007 | Niwa | B60R 13/0876 | 181/207 |
| 7,393,015 B1 * | 7/2008 | Gillespie | B62D 21/11 | 180/312 |
| 7,475,754 B2 * | 1/2009 | Misaki | B62D 21/11 | 180/291 |
| 7,810,466 B2 * | 10/2010 | Preimesberger | F02B 67/10 | 123/195 A |
| 7,815,250 B2 * | 10/2010 | Oshio | B62D 35/02 | 296/204 |
| 7,896,399 B1 * | 3/2011 | Orsini | F01N 13/1805 | 285/15 |
| 7,946,380 B2 * | 5/2011 | Yamamoto | F01N 13/20 | 181/227 |
| 8,376,331 B2 * | 2/2013 | Rodecker | F16F 7/00 | 267/141.4 |
| 8,430,198 B2 * | 4/2013 | Orihashi | F01N 13/1855 | 180/309 |
| 8,608,237 B2 * | 12/2013 | Hwang | B62D 25/20 | 296/193.07 |
| 8,672,367 B2 * | 3/2014 | Jacklich | F23J 13/04 | 285/402 |
| 8,697,990 B2 * | 4/2014 | Moore | H01R 27/02 | 174/58 |
| 8,939,694 B2 * | 1/2015 | Weiss | B60B 3/142 | 411/537 |
| 8,973,281 B1 * | 3/2015 | Fiquette | G01B 3/002 | 33/671 |
| 9,004,224 B2 * | 4/2015 | Uzawa | F01N 13/08 | 181/228 |
| 9,016,427 B2 * | 4/2015 | Yazaki | B62J 23/00 | 180/309 |
| 9,051,990 B2 * | 6/2015 | Helferich | B60K 13/04 | |
| 9,074,705 B2 * | 7/2015 | Saiki | F16L 58/14 | |
| 9,216,645 B1 * | 12/2015 | Saini | B60K 13/04 | |
| 9,249,713 B2 * | 2/2016 | Spieth | F01N 3/28 | |
| 9,249,714 B2 * | 2/2016 | Ewers | F01N 13/1872 | |
| 9,625,059 B2 * | 4/2017 | Meister | F16B 2/065 | |
| 9,650,939 B2 * | 5/2017 | Rodecker | F01N 13/1822 | |
| 9,664,332 B2 * | 5/2017 | Huhn | B62D 27/06 | |
| 9,840,960 B2 * | 12/2017 | Lampe | F01N 13/1805 | |
| 2001/0032909 A1 | 10/2001 | Goettle | F01N 13/1805 | 248/58 |
| 2002/0056992 A1 * | 5/2002 | Klok | F16L 35/00 | 285/1 |
| 2002/0153667 A1 * | 10/2002 | Battistoni | F01N 13/1805 | 277/602 |
| 2002/0175258 A1 * | 11/2002 | White | B60T 8/171 | 248/314 |

(56) References Cited

U.S. PATENT DOCUMENTS

| | | | |
|---|---|---|---|
| 2003/0056937 A1* | 3/2003 | Muller | F01N 13/1805 165/67 |
| 2003/0226412 A1* | 12/2003 | Rumminger | G01D 11/30 73/866.5 |
| 2004/0066028 A1* | 4/2004 | Edwards | B62D 25/188 280/851 |
| 2004/0069562 A1* | 4/2004 | Kondo | B60K 15/06 181/227 |
| 2004/0216284 A1* | 11/2004 | Belisle | F16L 21/065 24/279 |
| 2005/0184201 A1* | 8/2005 | Komitsu | B60K 13/04 248/58 |
| 2005/0269468 A1* | 12/2005 | Gough | B62B 5/00 248/300 |
| 2006/0042856 A1* | 3/2006 | Kim | F01N 13/1822 180/296 |
| 2006/0196049 A1* | 9/2006 | Opperman | B23K 9/202 29/890.08 |
| 2006/0266891 A1 | 11/2006 | Stammel et al. | |
| 2007/0119155 A1* | 5/2007 | Tongu | F01N 13/1805 60/299 |
| 2007/0170316 A1 | 7/2007 | Perez | |
| 2007/0258754 A1* | 11/2007 | Riekers | B60K 13/04 403/120 |
| 2007/0262222 A1* | 11/2007 | Steigert | F01N 13/10 248/300 |
| 2008/0223172 A1* | 9/2008 | Pullen | B23K 1/0008 74/572.4 |
| 2008/0301940 A1* | 12/2008 | Wirth | F01N 3/2839 29/890 |
| 2009/0101434 A1* | 4/2009 | Sammut | F01N 13/1888 181/227 |
| 2010/0314504 A1* | 12/2010 | Dickinson | F01N 13/1855 248/74.1 |
| 2011/0108700 A1* | 5/2011 | Wheeler | F16L 3/20 248/636 |
| 2011/0115258 A1* | 5/2011 | Oh | F16F 1/3849 296/193.07 |
| 2011/0167808 A1* | 7/2011 | Kosaka | F01N 13/1894 60/311 |
| 2012/0104224 A1 | 5/2012 | Ewers et al. | |
| 2012/0137665 A1* | 6/2012 | Spieth | F01N 13/1822 60/299 |
| 2012/0152643 A1* | 6/2012 | Orihashi | F01N 13/1855 180/309 |
| 2012/0204993 A1* | 8/2012 | Higai | B21D 47/04 138/157 |
| 2012/0273296 A1* | 11/2012 | Nording | F01N 1/083 181/198 |
| 2012/0301249 A1* | 11/2012 | Jablonski | F16B 35/00 411/394 |
| 2013/0056589 A1 | 3/2013 | Lampe et al. | |
| 2013/0075192 A1* | 3/2013 | Hayama | F01N 3/2885 181/228 |
| 2013/0076016 A1* | 3/2013 | Aoki | B62D 25/145 280/779 |
| 2013/0160428 A1* | 6/2013 | Okuda | F01N 13/1805 60/272 |
| 2014/0000745 A1* | 1/2014 | Bednarz | F01N 13/1822 138/106 |
| 2014/0090926 A1* | 4/2014 | Uzawa | F01N 1/08 181/228 |
| 2014/0130442 A1* | 5/2014 | Fuller | E04B 7/022 52/696 |
| 2014/0196973 A1* | 7/2014 | Sellars | F01N 13/00 180/309 |
| 2015/0101329 A1* | 4/2015 | Tiefenbacher | B62D 21/15 60/605.1 |
| 2015/0159787 A1* | 6/2015 | Abram | B23K 31/02 285/288.2 |
| 2015/0315954 A1* | 11/2015 | Edemann | B21D 53/36 285/420 |
| 2015/0352659 A1* | 12/2015 | Sigler | B23K 11/36 219/91.2 |
| 2015/0354433 A1* | 12/2015 | Namikiri | F01N 1/02 29/890.08 |
| 2016/0069247 A1* | 3/2016 | Rodecker | F01N 13/1822 248/635 |
| 2016/0091079 A1* | 3/2016 | Compton | B60K 17/00 248/674 |
| 2016/0108792 A1* | 4/2016 | Kobe | F01N 13/1805 181/228 |
| 2016/0129774 A1* | 5/2016 | Shibata | B62D 25/082 180/297 |
| 2016/0229465 A1* | 8/2016 | Goto | B62D 21/00 |
| 2016/0230261 A1* | 8/2016 | Urashima | C22C 38/20 |
| 2016/0230638 A1* | 8/2016 | Spieth | F01N 13/1822 |
| 2016/0280147 A1* | 9/2016 | Henry | B60R 9/048 |
| 2016/0369940 A1* | 12/2016 | Patil | F01N 3/2066 |
| 2017/0037767 A1* | 2/2017 | Wagner | F01N 13/1822 |
| 2018/0013382 A1* | 1/2018 | Smeja | F24S 25/61 |
| 2018/0291793 A1* | 10/2018 | Shen | F16B 7/04 |
| 2018/0291794 A1* | 10/2018 | Hill | F01N 13/1844 |
| 2019/0186331 A1* | 6/2019 | Yamazaki | B60K 13/04 |
| 2019/0186887 A1* | 6/2019 | Llicic | G01B 3/34 |
| 2019/0323410 A1* | 10/2019 | Holmes | B60K 13/04 |
| 2020/0056531 A1* | 2/2020 | Rodecker | F01N 13/1822 |

* cited by examiner

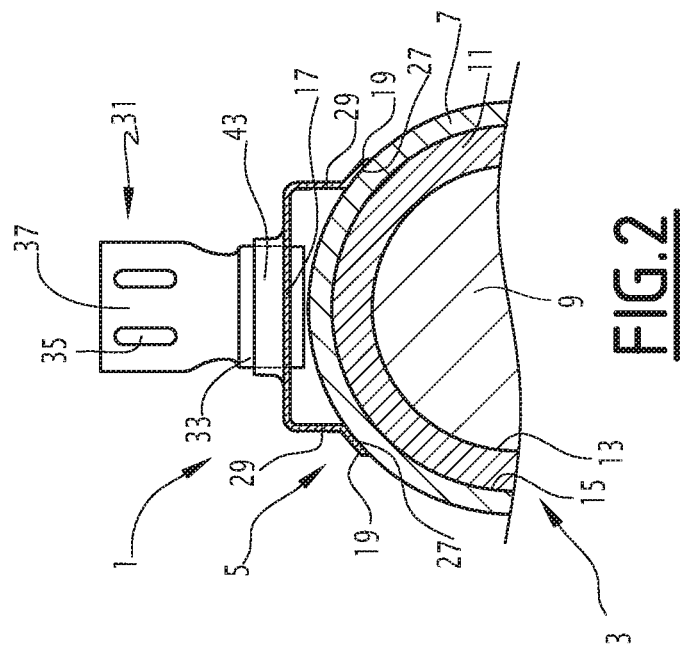
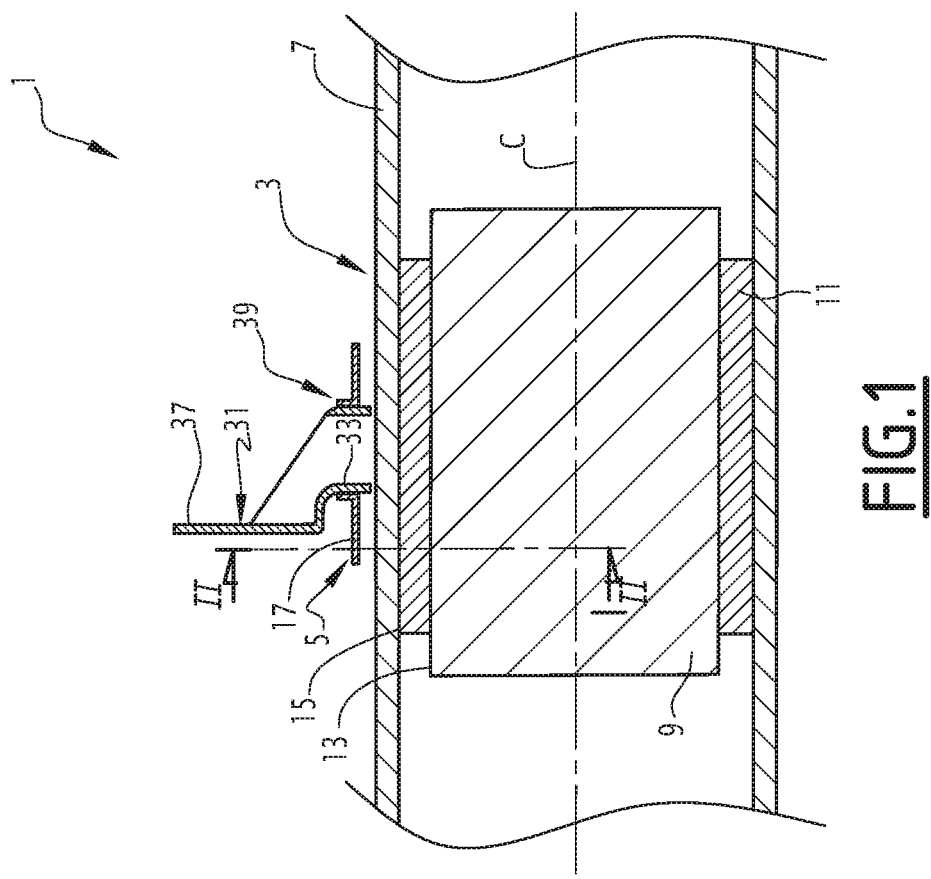

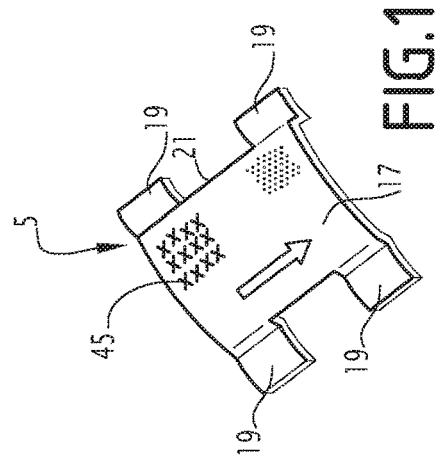
FIG.11
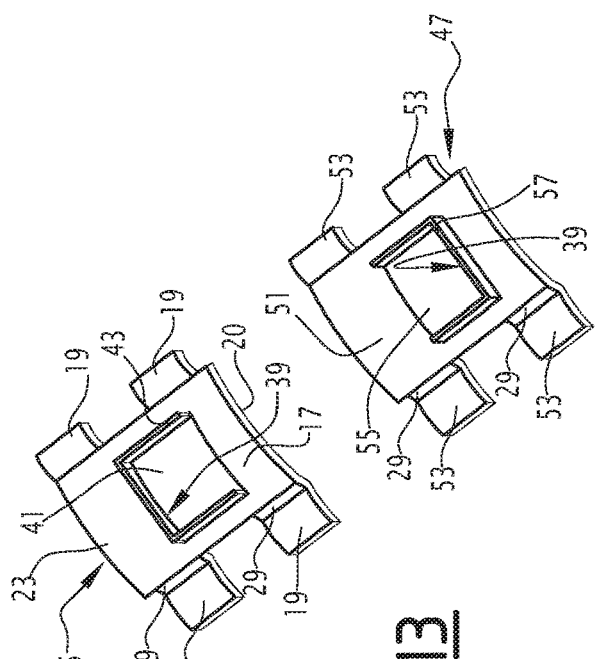
FIG.13
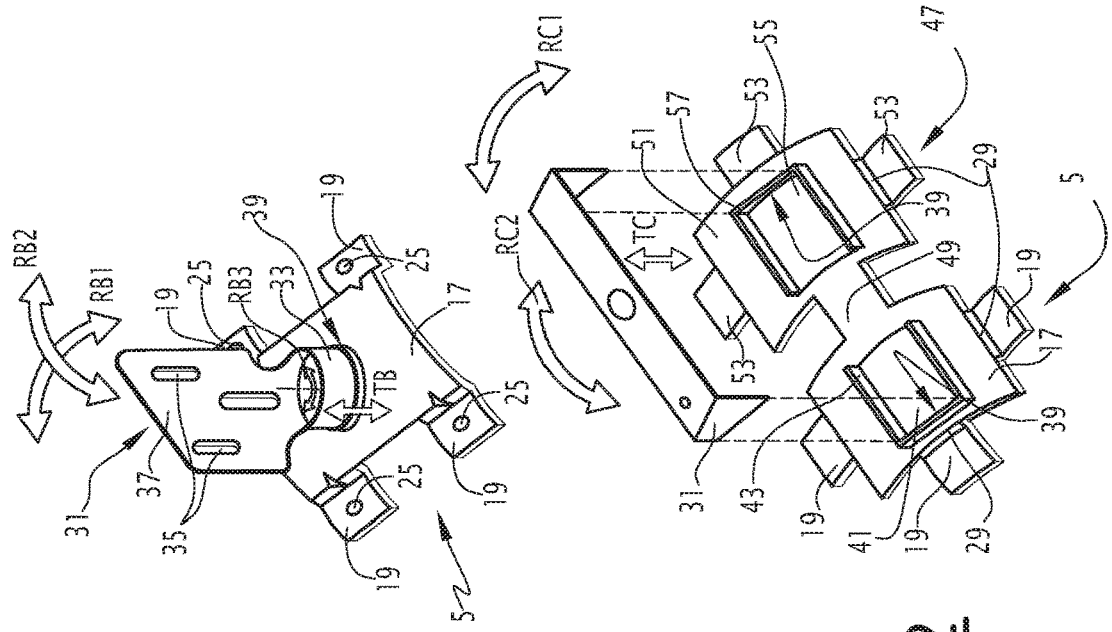
FIG.10
FIG.12

PART OF AN EXHAUST LINE, AND MANUFACTURING PROCESS OF SAID PART

CROSS-REFERENCE TO RELATED APPLICATION

This application claims priority to FR 1753437, filed Apr. 20, 2017.

FIELD OF INVENTION

The present invention generally relates to the fastening of accessories, such as hooks for example, on thin-walled exhaust volumes.

BACKGROUND

FR 2,853,949 describes an exhaust line element including a tube on which a pin is fastened via a spacer. Such a fastener must satisfy a large number of constraints. In particular, the welding of the spacer on the tube must not cause an excessive heat transfer to the tube, so as not to damage the latter. The welding must also guarantee sufficient strength throughout the entire lifetime of the vehicle.

Furthermore, the corrosion in the welded area must be limited, again to guarantee that the fastening holds throughout the entire lifetime of the vehicle.

SUMMARY

In this context, the invention relates to an exhaust line element, the element comprising:
an exhaust volume comprising a metal enclosure with a thickness smaller than 1 mm;
at least one metal plate with a thickness comprised between 0.5 and 5 mm and comprising a central part free from contact with the metal enclosure and between 2 and 4 fastening tabs secured to the central part, each fastening tab being spot and transparently welded to the metal enclosure.

Because only the fastening tabs are welded to the metal enclosure by spot and transparent welding, the heat transfer to the metal enclosure of the exhaust volume during welding is extremely limited.

Providing only between two and four fastening tabs makes it possible to guarantee good contact between the metal plate and the enclosure of the exhaust volume during welding. This is key to guarantee the quality of the welding, and consequently the mechanical strength of the bond between the plate and the metal enclosure after welding. Indeed, if the metal plate comprises more than four fastening tabs, it is difficult to guarantee that all of the tabs are positioned in contact with the metal enclosure, for isostatism reasons.

Furthermore, the fact that the central area of the plate has no contact with the metal enclosure makes it possible to greatly reduce the contact surface between the metal plate and the metal enclosure. The risk of corrosion, in particular of the crevice corrosion type, is reduced.

The assembly may also have one or more of the features below, considered individually or according to any technical possible combination(s):
the fastening tabs are welded using a TIG method;
the fastening tabs have a shape chosen to be in contact without interstitial spaces with the metal enclosure;
the exhaust line element includes an accessory configured to be fastened to a motor vehicle structure, wherein the accessory is welded to the metal plate;
the exhaust line element includes a guide element arranged to give the fastening accessory, relative to the metal plate, before welding, a degree of translational freedom in a direction substantially perpendicular to an area of the metal enclosure located below the metal plate and at least two, preferably three, degrees of rotational freedom;
the metal plate bears an identification reference hollowed in the metal plate;
the metal plate is integral;
the exhaust line element includes a second plate, connected to the metal plate by a flexible material bridge, the second plate having a thickness comprised between 0.5 and 5 mm and comprising a second central part free from contact with the metal enclosure and between 2 and 4 second fastening tabs secured to the second central part, each second fastening tab being welded to the metal enclosure by spot and transparent welding;
the metal plate and the second plate are integral;
the exhaust line element includes an accessory configured to be fastened to a motor vehicle structure, wherein the accessory is welded to the metal plate and to the second plate;
the exhaust line element includes a second plate completely independent from the metal plate, the second plate having a thickness comprised between 0.5 and 5 mm and comprising a second central part free from contact with the metal enclosure and between 2 and 4 second fastening tabs secured to the second central part, each second fastening tab being welded to the metal enclosure by spot and transparent welding, the exhaust line element further including an accessory configured to be fastened to a motor vehicle structure, wherein the accessory is welded to the metal plate and to the second plate.

According to a second aspect, the invention pertains to a vehicle exhaust line equipped with an element having the above features.

According to a third aspect, the invention relates to a method for manufacturing an exhaust line element, the method comprising the following steps:
obtaining an exhaust volume comprising a metal enclosure with a thickness smaller than 1 mm;
obtaining at least one metal plate with a thickness comprised between 0.5 and 5 mm and comprising a central part free from contact with the metal enclosure and between 2 and 4 fastening tabs secured to the central part; and
welding each fastening tab to the metal enclosure by spot and transparent welding.

Advantageously, the exhaust volume is positioned, relative to the metal plate, before welding of the fastening tabs, by a tool that allows at least one, preferably three, relative rotational movements and one relative translational movement of the metal enclosure with respect to the metal plate.

BRIEF DESCRIPTION OF THE DRAWINGS

Other features and advantages of the invention will emerge from the detailed description thereof provided below, for information and non-limitingly, in reference to the appended figures, in which:

FIG. 1 is a schematic sectional view of an exhaust line element according to the invention, a section being taken along the axis of the exhaust volume and that of an accessory;

FIG. 2 is a cross-sectional view of the exhaust line element along arrows II of FIG. 1;

FIG. 10 shows the possible movements of the accessory relative to the metal plate;

FIG. 11 is a perspective view of a metal plate bearing an identification reference; and FIGS. 12 and 13 are perspective views of alternative embodiments in which the exhaust line element includes two plates welded on the metal enclosure of the exhaust volume, the two plates respectively being connected to one another by a flexible material bridge and being completely independent of one another.

DETAILED DESCRIPTION

Figure 7:
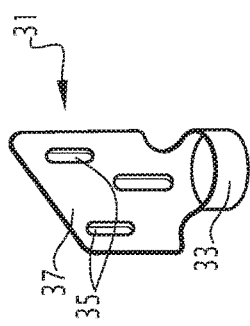
FIGS. 6 and 7 are perspective and sectional views, respectively, of a fastening tab after spot and transparent welding.

The element 1 shown in FIGS. 1 and 2 is intended to be incorporated into an exhaust line. This exhaust line is typically an exhaust line intended to capture and treat the exhaust gases coming from a heat engine.

The exhaust line typically equips a vehicle, in particular a motor vehicle such as a car or truck.

As shown in FIGS. 1 and 2, the exhaust line element 1 comprises an exhaust volume 3 and at least one metal plate 5.

The exhaust volume 3 comprises a metal enclosure 7 with a thickness smaller than 1 mm.

The exhaust volume 3 is for example intended to purify exhaust gases.

In this case, the exhaust volume 3 comprises, as shown in FIG. 1, an exhaust gas purification member 9 arranged in the metal enclosure 7. A maintaining web 11 is inserted between the purification member 9 and the metal enclosure 7.

The purification member 9 is of any suitable type. For example, it is a three-way catalyst, or an oxidation catalyst, or an SCR (Selective Catalytic Reduction) catalyst, or a particle filter, etc.

The metal enclosure 7 typically has a tubular shape, with a central axis C.

The maintaining web 11 is inserted, in radial directions relative to the central axis C, between a lateral surface 13 of the purification member 9 and an inner surface 15 of the metal enclosure 7. The maintaining web 11 is provided to keep the purification member 9 in position relative to the metal enclosure 7, axially and radially. It is placed between the metal enclosure 7 and the purification member 9, and exerts pressure on the purification member 9 oriented toward the central axis C. It is typically made up of glass fibers and an organic binder.

The metal plate 5, along the central axis C, is typically located on the same level as the maintaining web 11.

Alternatively, the exhaust volume 3 is another thin-walled member of the exhaust line. For example, the volume 3 is an exhaust pipe section, or a muffler, or any other member of the exhaust line.

The metal enclosure 7 has, as indicated above, a thickness smaller than 1 mm, preferably comprised between 0.2 and 0.8 mm, still more preferably comprised between 0.6 and 0.8 mm.

The metal enclosure 7 is for example made from grade 1.4509 ferritic steel or 1.4301 stainless steel.

The metal plate 5 is typically a very thick metal plate, more specifically having a thickness comprised between 0.5 and 5 mm. Typically, the metal plate 5 has a thickness comprised between 1 and 2.5 mm.

The metal plate is made from a material such as 1.4509 or 1.4510 ferritic steel or 1.4301 stainless steel.

"Plate" here refers to a part having a small thickness in light of its surface.

The plate is typically integral. It is shaped using any type of method: bending, stamping, etc.

Alternatively, the plate is made in several pieces, fastened to one another.

As shown in FIGS. 2 to 5, the metal plate 5 includes a central part 17 having no contact with the metal enclosure, and between two and four fastening tabs 19 that are secured to the central part 17.

Figure 3:
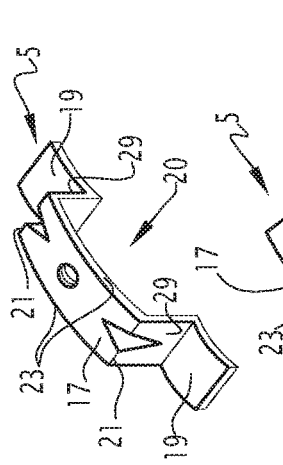
FIGS. 3 to 5 are perspective views of metal plates respectively having two, three and four fastening tabs.
Figure 4:
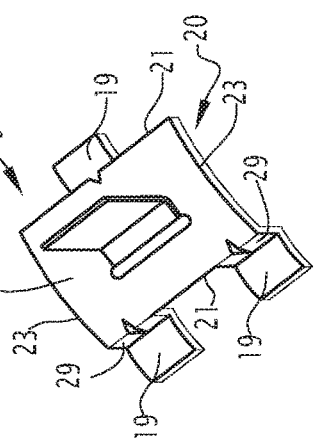
Figure 5:
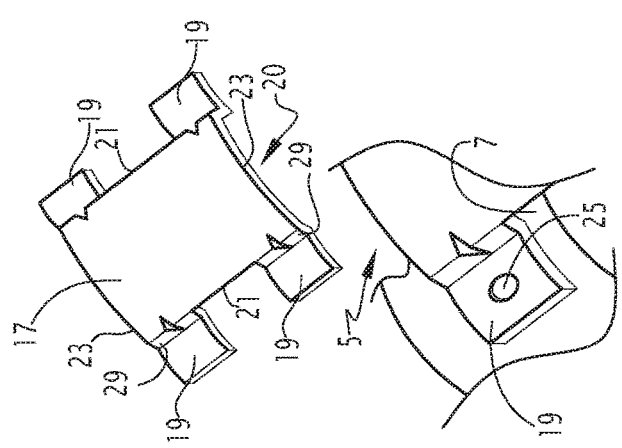

FIGS. 3 to 5 illustrate metal plate examples respectively having two fastening tabs, three fastening tabs, four fastening tabs 19.

The central part 17 has any type of shape: rectangular, circular, oval, etc.

The central part 17 is defined by a peripheral edge 20. The peripheral edge 20 preferably bears the fastening tabs 19.

Typically, the fastening tabs 19 are distributed around the central part 17.

In the illustrated examples, the central part 17 has a substantially rectangular shape, the peripheral edge 20 includes two longitudinal edges 21 and two transverse edges 23 that connect the two longitudinal edges 21 to one another.

The fastening tabs 19 are fastened to the longitudinal edges 21.

When the metal plate 5 has only two tabs, each longitudinal edge 21 bears a tab (see FIG. 3).

When the plate 5 includes three fastening tabs 19, one of the longitudinal edges 21 bears two fastening tabs 19, and the other bears one fastening tab 19 (FIG. 4). The two fastening tabs 19 are then preferably at the two opposite ends of the corresponding longitudinal edge 21. The third fastening tab 19 in this case is located at the center of the other longitudinal edge 21.

When the metal plate 5 includes four fastening tabs 19, each longitudinal edge 21 bears two fastening tabs 19, arranged at its two opposite ends.

Alternatively, if the plate 5 includes three or four fastening tabs 19, these tabs can be placed each on a different edge of the central part 17.

The central part 17 does not touch the metal enclosure 7. It is separated from the metal enclosure 7 by a continuous air knife. Thus, the metal plate 5 is in contact with the metal enclosure 7 only via fastening tabs 19.

Each fastening tab 19 is welded to the metal enclosure 7 by spot and transparent welding.

Figure 6:
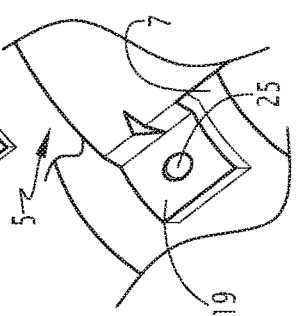

This means that each fastening tab 19 is fastened to the metal enclosure 7 by one or several spots, and not by a continuous weld line. Typically, each fastening tab 19 is fastened to the metal enclosure 7 by a single weld spot 25 (see FIGS. 6 and 7).

The length L of the or each weld spot (FIG. 7) at the interface of the metal enclosure 7 and the fastening tab 19 is preferably greater than two times the minimum thickness of the metal enclosure 7 and the fastening tab 19. The thickness of the metal enclosure 7 is generally smaller than that of the metal plate 5. In this case, the length L at the interface of the metal enclosure 7 and the fastening tab 19 is greater than twice the thickness of the metal enclosure 7.

The welding is done by transparency in that each weld spot 25 is made at a distance from the edges of the tab 19, in a solid area of the tab 19. The metal making up the tab 19 is melted and bathes the metal making up the metal enclosure 7. The heat provided for the welding spreads in the metal making up the enclosure 7, which in turn partially melts. The metal making up the tab 19 and the metal making up the metal enclosure 7 mix. After cooling, the tab 19 is fastened to the enclosure 7.

Preferably, the fastening tabs 19 are welded using a TIG (Tungsten Inert Gas) method. Such a welding method is well suited to spot and transparent welding. It makes it possible to reduce the quantity of energy supplied to perform the welding, which reduces the risk of the maintaining web 11 being excessively heated. Indeed, if the web 11 is heated excessively, it degasses, since the binder that makes up the web becomes sublimated, and the area heated by the welding operation is exposed to an increased gas pressure, which may lead to a decrease in the thickness of the metal enclosure 7 in the exact position of the welding. Over time, this leads to weakening of the fastening of the metal plate 5 on the enclosure 7. Such a risk is considerably decreased when the welding of the fastening tabs 19 is done using the TIG method, and is a spot and transparent welding.

Advantageously, the fastening tabs 19 have a shape chosen to be in contact without interstitial spaces with the metal enclosure 7.

The fastening tabs 19 are provided to be arranged on predetermined areas 27 of the metal enclosure (FIG. 2). The metal plate 5 is therefore manufactured such that, before fastening to the exhaust volume 3, each tab 19 has a shape corresponding to that of the area 27 where it will be placed.

In the illustrated example, the metal enclosure 7 has a substantially cylindrical shape. The tabs 19 therefore each have a bowed cylinder sector shape, with a curvature corresponding to the curvature of the areas 27.

Alternatively, the tabs 19 are provided to be placed on planar areas 27 of the metal enclosure. In this case, the tabs 19 have a planar shape.

The lack of interstitial space between the tabs 19 and the metal enclosure 7 makes it possible to obtain an excellent welding quality.

The fastening tabs 19 are typically portions of the metal plate 5, each having a small surface with respect to the total surface of the metal plate.

Each fastening tab 19 protrudes relative to the peripheral edge 20 of the central part 17. The tabs 19 are offset at a level lower than that of the central part 17. They are not in the plane of the central part 17, but on the contrary are connected to this central part by a recess forming a step 29. The step 29 has any type of height. In the example of FIG. 3, this height is relatively larger. In the examples of FIGS. 4 and 5, the height is relatively smaller.

The exhaust line element 1 advantageously includes an accessory 31 for fastening to a motor vehicle structure, which is welded to the metal plate 5. This accessory 31 is in particular illustrated in FIGS. 8, 9 and 10.

The accessory 31 is, for example, provided to be fastened to a chassis of the vehicle. It makes it possible to suspend the exhaust line from the structure of the vehicle.

The accessory 31 is of any suitable type.

Figure 8:
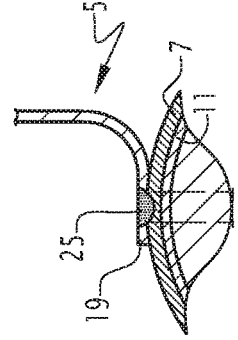
FIG. 8 is an exploded perspective view showing the metal plate and an accessory provided for fastening the exhaust line element to a motor vehicle structure.
Figure 9:
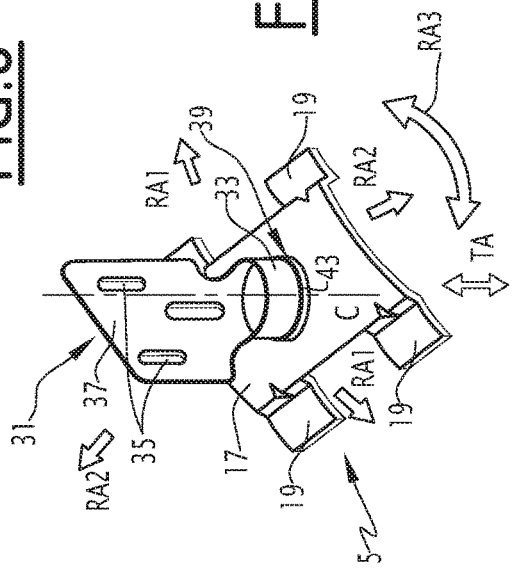
FIG. 9 shows the possible movements of the metal plate relative to the metal enclosure of the exhaust volume.

For example, the accessory 31 has a substantially cylindrical shape, as shown in FIGS. 8, 9 and 10.

Alternatively, the accessory 31 may also have a substantially parallelepiped shape.

The accessory 31 includes a lower part 33 intended to be fastened to the metal plate 5, and a fastener 35 provided for fastening to the structure of the vehicle.

In the illustrated example, the fastener 35 is an orifice arranged in an upper surface 37 of the accessory 31. Alternatively, the fastener is a tab.

As indicated above, the fact that the metal plate 5 includes between two and four fastening tabs 19 makes it possible to make the connection of the metal plate 5 to the enclosure 7 isostatic, and therefore to have contact between each tab 19 and the enclosure 7.

This can be obtained without difficulty when the metal plate 5 and the enclosure 7 have an ideal geometry.

The metal plate 5 and the metal enclosure 7 may, however, have slight shape flaws. For this reason and to guarantee the isostatism despite the slight shape flaws, the tool that positions the exhaust volume 3 relative to the metal plate 5, before welding, allows at least one, preferably three, relative rotational movements RA1, RA2, RA3, and a relative translational movement TA of the metal enclosure 7 with respect to the metal plate 5 (FIG. 9).

This makes it possible to move the metal plate 5 relative to the metal enclosure 7 in a range of final positions, the welding of the metal plate 5 to the metal enclosure 7 being possible in each of the final positions in the range.

For a tubular metal enclosure, the translation TA is typically in a direction substantially perpendicular to the central axis C and substantially parallel to the plane of the fastening accessory 31. Typically, the rotation RA3 is around the central axis C. The rotations RA1 and RA2 are around two axes perpendicular to the central axis C and perpendicular to one another.

Advantageously, the exhaust line element 1 includes a guide element 39 arranged to give the fastening accessory 31, relative to the plate 5, before welding, a degree of translational freedom TB and at least two degrees of rotational freedom.

The guide element 39 is advantageously arranged to give the fastening accessory 31, relative to the plate 5, before welding, three degrees of rotational freedom RB1, RB2, RB3, as illustrated in FIG. 10.

The translation direction TB is substantially perpendicular to the area of the metal enclosure 7 located below the plate 5. This translation direction TB is illustrated in FIG. 10.

Typically, the rotation RB3 is around the translation direction TB. The rotations RB1 and RB2 are around two axes perpendicular to the translation direction TB and perpendicular to one another.

This makes it possible to move the fastening accessory 31 relative to the metal plate 5 into a final position predetermined by design, the welding of the fastening accessory 31 to the metal plate 5 being possible irrespective of the shape flaws of the metal enclosure 7, the metal plate 5, and the fastening accessory 31.

The guide element 39 allows the fastening accessory 31 to slide while remaining in contact with the metal plate 5, before fastening.

Thus, in total, the fastening accessory 31 preferably has at least six degrees of freedom relative to the metal enclosure 7: the translations TA and TB, the rotations RB1, RB2 and RB3, and one of the rotations RA1, RA2 or RA3.

For example, the guide element 39 includes an orifice 41 cut in the central part 17 of the metal plate 5, with a shape conjugated to that of the lower part 33 of the accessory 31. In the illustrated example, this shape is circular.

Alternatively, this shape can be rectangular, square, or any other shape.

When the orifice 41 is circular, the guide element 39 is said to be circular and is arranged to impart a degree of translational freedom and three degrees of rotational freedom, as described above.

When the orifice 41 is not circular, for example rectangular, the guide element 39 is arranged to give the fastening accessory 31, relative to the plate 5, before welding, a degree of translational freedom TC and two degrees of rotational freedom RC1, RC2, as illustrated in FIG. 12.

The translation direction TC is substantially perpendicular to the area of the metal enclosure 7 located below the plate 5.

Typically, the rotations RC1 and RC2 are around two axes perpendicular to the direction TC and perpendicular to one another.

The orifice 41 is surrounded by an upright edge 43 that protrudes opposite the metal enclosure 7 relative to the central part 17. Thus, the upright edge 43 protrudes opposite the tabs 19.

The lower part 33 of the accessory 31 is engaged in the orifice 41. After rigid fastening of the accessory to the metal plate 5, it is possible to adjust the position of the accessory relative to the metal plate 5, through rotations and translation of the accessory 5 in the orifice 41.

The accessory 31 is welded to the metal plate 5 using any appropriate method. For example, it is welded to the upright edge 43 using an MIG (Metal Inert Gas) or MAG (Metal Active Gas) method.

It is important to stress that the invention makes it possible to position the fastener 35 precisely with respect to the volume 3, since it offers multiple degrees of freedom to the assembly made up of the fastener 35, the metal plate 5, and the volume 3. These multiple degrees of freedom (TA, RA1, RA2, RA3 as well as TB, RB1, RB2 and RB3 or TC RC1 and RC2) are illustrated in FIGS. 9, 10 and 12.

This means that the position of the fastener 35 can be adjusted relative to the metal plate 5 with three or four possible degrees of freedom, with the metal plate 5 being adjusted relative to the exhaust volume 3 with between two and four possible degrees of freedom.

This in particular makes it possible to position the fastener 35 precisely relative to the exhaust volume 3 even if the metal enclosure 7 and/or the metal plate 5 has or have a local shape flaw. The shape flaw of the enclosure 7, for example, corresponds to an out-of-roundness of the enclosure 7 during the placement of the purification member 9 and the maintaining web 11 inside the enclosure 7. If the fastening accessory was in one piece with the plate 5, or if no degree of freedom of the plate 5 existed relative to the metal enclosure 7, such a local deformation could cause an error in the position of the fastener 35.

Advantageously, the plate 5 bears an identification reference 45, hollowed in said plate 5.

Such an identification reference 45 is shown in FIG. 11. This reference is for example the serial number assigned by the manufacturer to the exhaust line element.

Typically, this identification reference 45 is etched in the metal plate 5, using any suitable method.

The identification reference must be visible for at least 15 years to comply with the legal stipulations in force. Consequently, the identification reference 45 must be hollowed over a depth of at least 0.15 mm.

It is particularly advantageous for this identification reference to be hollowed in the metal plate 5, and not directly in the metal enclosure 7. Due to the hollowing depth of at least 0.15 mm, the residual thickness of metal in the metal enclosure 7 would be reduced. It would not be possible to guarantee corrosion resistance and long-term integrity of the exhaust volume.

The metal plate 5 may bear only the identification reference 45, without the fastening accessory 31. Alternatively, it bears the fastening accessory 31 without the identification reference 45. According to another alternative, it bears both the fastening accessory 31 and the identification reference 45.

Advantageously, the exhaust line element 1 includes a second plate 47, connected to the metal plate 5 by a flexible material bridge 49 (see FIG. 12).

The second plate 47 has a thickness comprised between 0.5 and 5 mm. It advantageously comprises a second central part 51 without contact with the metal enclosure 7 and between two and four second fastening tabs 53 secured to the second central part 51. Each second fastening tab 53 is welded to the metal enclosure 7 by spot and transparent welding.

In other words, the second plate 47 has the same features as the metal plate 5 described above.

Because the metal plate 5 and the second plate 47 each have between two and four fastening tabs, in total, the subassembly made up of the two plates includes between four and eight fastening tabs.

This makes it possible to increase the strength of the fastener of said subassembly at the metal enclosure 7.

The connection between the metal plate 5 and the metal enclosure 7 remains isostatic, due to the fact that the metal plate 5 includes between two and four fastening tabs, and the connection between the metal plate 5 and the second metal plate 47 is flexible. Thus, it remains possible to vary the position of the metal plate 5 with respect to the second plate 47.

The same situation prevails for the second plate 47, which remains isostatic. This is obtained due to the flexibility of the connection with the metal plate 5, and due to the number of fastening tabs equipping the second plate 47.

A fastening accessory 31 is provided to be welded both to the metal plate 5 and the second plate 47.

To that end, the guide element 39 includes, aside from the orifice 41 arranged in the metal plate 5, an orifice 55 arranged in the second plate 47. The fastening accessory 31 thus has one degree of translational freedom TC and two degrees of rotational freedom RC1 and RC2, before welding, relative to the metal plate 5 and relative to the second plate 47 (FIG. 12).

In the example illustrated in FIG. 12, the orifice 41 and the orifice 55 are each partially surrounded by an upright edge, respectively referenced 43 and 57. The upright edges 43 and 57 extend over two or three consecutive sides of the corresponding orifice. They do not extend along the side of the orifices 41 and 55, which are across from one another.

Preferably, the metal plate 5 and the second plate 47 are integral with one another. Alternatively, the metal plate 5 and the second plate 47 are manufactured independently of one another, and are next fastened to one another by the material bridge 49.

In one alternative embodiment, the metal plate 5 and the second plate 47 are completely independent of one another (see FIG. 13). Again, the second plate 47 is of the same type as the metal plate 5 described above, and has the same features. The fastening accessory 31 is welded to the two plates.

This alternative embodiment has the advantage of allowing an excellent adaptation of the position of each of the plates 5, 47 to any deformations of the metal enclosure 7. Conversely, during the welding of each of the plates 5, 47 on the metal enclosure 7, it is necessary to carefully check the respective positions of the two plates relative to one another.

According to a second aspect, the invention relates to a method for manufacturing an exhaust line element. The method includes the following steps:
- obtaining an exhaust volume 3 comprising a metal enclosure 7 with a thickness smaller than 1 mm;
- obtaining a metal plate 5 with a thickness comprised between 0.5 and 5 mm and comprising a central part 17 free from contact with the metal enclosure 7 and between two and four fastening tabs 19 secured to the central part 17; and
- welding each fastening tab 19 to the metal enclosure 7 by spot and transparent welding.

The manufacturing method is specially designed to manufacture an exhaust line element of the type described above.

The exhaust volume 3, in particular metal enclosure 7, has the above features.

The metal plate 5 is of the type described above.

Thus, the exhaust line element 1 described above is particularly suitable for being produced using the manufacturing method of the invention.

Advantageously, the exhaust volume 3 is positioned, relative to the metal plate 5, before welding of the fastening tabs 19, by a tool that allows at least one, preferably three, relative rotational movements RA1, RA2, RA3 and one relative translational movement TA of the metal enclosure 7 with respect to the metal plate 5 (FIG. 9).

For a tubular metal enclosure, the translation TA is typically in a direction substantially perpendicular to the central axis C and substantially parallel to the plane of the fastening element 31.

Typically, the metal plate 5 is movable at least according to one of the rotations RA1, RA2 or RA3, or in the direction TA.

Preferably, the method includes a step for welding, to the metal plate 5, an accessory 31 for fastening to a motor vehicle structure.

Before said welding step, the method includes a step for adjusting the position of the fastening accessory 31, relative to the plate 5, in translation along the direction TB and in rotation around at least two rotation axes.

Typically, in the adjustment step, the position of the fastening accessory 31, relative to the plate 5, is adjusted in rotation around three rotation axes RB1, RB2, RB3.

The translation direction TB is substantially perpendicular to the area of the metal enclosure 7 located below the plate 5.

Typically, the rotation RB3 is around the direction TB. The rotations RB1 and $N2 are around two axes perpendicular to the direction TB and perpendicular to one another.

The invention claimed is:

1. An exhaust line element comprising:
an exhaust volume comprising a metal enclosure;
at least one metal plate with a thickness comprised between 0.5 and 5 mm, the metal plate comprising a central part free from contact with the metal enclosure and between 2 and 4 fastening tabs secured to the central part, each fastening tab being spot and transparently welded to the metal enclosure;
wherein the exhaust line element includes a second plate connected to the metal plate by a bridge, the second plate having a thickness comprised between 0.5 and 5 mm and comprising a second central part free from contact with the metal enclosure and between 2 and 4 second fastening tabs secured to the second central part, each second fastening tab being welded to the metal enclosure by spot and transparent welding;
wherein the exhaust line element includes an accessory configured to be fastened to a motor vehicle structure, wherein the accessory is welded to the at least one metal plate and to the second plate;
the central part of the at least one metal plate having two longitudinal edges opposed to one another, at least one fastening tab being secured to each longitudinal edge; and
the second central part of the second plate having two second longitudinal edges opposed to one another, at least one second fastening tab being secured to each second longitudinal edge.

2. The exhaust element according to claim 1, wherein the central part of the metal plate is substantially parallel to an area of the metal enclosure located below the metal plate.

3. The exhaust element according to claim 1, wherein the second central part of the second metal plate is substantially parallel to an area of the metal enclosure located below the second metal plate.

4. The exhaust line element according to claim 1, wherein the fastening tabs have a shape chosen to be in contact without interstitial spaces with the metal enclosure.

5. The exhaust line element according to claim 1, including a guide element arranged to give the accessory, relative to the at least one metal plate, before welding, a degree of translational freedom in a direction substantially perpendicular to an area of the metal enclosure located below the at least one metal plate and at least two degrees of rotational freedom.

6. The exhaust line element according to claim 1, wherein the at least one metal plate is integral.

7. The exhaust line element according to claim 1, wherein the at least one metal plate and the second plate are integral.

8. An exhaust line element comprising:
an exhaust volume comprising a metal enclosure with a thickness smaller than 1 mm;
at least one metal plate with a thickness comprised between 0.5 and 5 mm, the metal plate comprising a central part free from contact with the metal enclosure and between 2 and 4 fastening tabs secured to the central part, each fastening tab being spot and transparently welded to the metal enclosure;
an accessory configured to be fastened to a motor vehicle structure, the accessory including a lower part welded to the metal plate and a fastener to fasten to the structure of the vehicle;
a guide element including an orifice cut in the central part of the metal plate, the orifice having an inner section identical to an outer section of the lower part of the accessory, said lower part being inserted in said orifice; and
wherein the exhaust line element includes a second plate connected to the metal plate by a flexible material bridge, the second plate having a thickness comprised between 0.5 and 5 mm and comprising a second central part free from contact with the metal enclosure and between 2 and 4 second fastening tabs secured to the second central part, each second fastening tab being welded to the metal enclosure by spot and transparent welding.

9. An exhaust line element comprising:

an exhaust volume comprising a metal enclosure;

a first metal plate comprising a first central part free from contact with the metal enclosure and a plurality of first fastening tabs secured to the first central part, each first fastening tab being spot and transparently welded to the metal enclosure;

a second metal plate connected to the first metal plate by a bridge, the second metal plate comprising a second central part free from contact with the metal enclosure and a plurality of second fastening tabs secured to the second central part, each second fastening tab being welded to the metal enclosure by spot and transparent welding;

a fastening accessory configured to be fastened to a motor vehicle structure, wherein the fastening accessory is welded to the first metal plate and to the second metal plate;

the first central part of the first metal plate having two first longitudinal edges opposed to one another, at least one first fastening tab being secured to each first longitudinal edge; and the second central part of the second metal plate having two second longitudinal edges opposed to one another, at least one second fastening tab being secured to each second longitudinal edge.

10. The exhaust element according to claim 9, wherein the first metal plate and the second metal plate each have a thickness comprised between 0.5 and 5 mm.

11. The exhaust element according to claim 9, wherein the plurality of first fastening tabs is between 2 and 4 first fastening tabs, and wherein the plurality of second fastening tabs is between 2 and 4 second fastening tabs.

12. The exhaust element according to claim 9, including a guide element associated with each of the first and the second metal plates, wherein the guide element is arranged to give the fastening accessory, relative to the first and second metal plates, before welding, at least a degree of translational freedom and a degree of rotational freedom.

13. The exhaust element according to claim 12, wherein the guide element comprises a first orifice cut in the first central part of the first metal plate and a second orifice cut in the second central part of the second metal plate.

14. The exhaust element according to claim 9, including two first transverse edges that connect the two first longitudinal edges to one another and two second transverse edges that connect the two second longitudinal edges to one another, and wherein the bridge extends between at least one first transverse edge and one second transverse edge.

* * * * *